(12) United States Patent
Chang et al.

(10) Patent No.: US 8,375,154 B2
(45) Date of Patent: Feb. 12, 2013

(54) ELECTRONIC DEVICE CAPABLE OF MATCHING A MULTIMEDIA PLAYBACK DEVICE

(75) Inventors: Jen-Yung Chang, Taipei Hsien (TW); Shih-Hong Chen, Taipei Hsien (TW); Chien-Chih Chung, Taipei Hsien (TW)

(73) Assignee: Wistron Neweb Corp., Taipei Hsien (TW)

( * ) Notice: Subject to any disclaimer, the term of this patent is extended or adjusted under 35 U.S.C. 154(b) by 92 days.

(21) Appl. No.: 12/588,130

(22) Filed: Oct. 6, 2009

(65) Prior Publication Data

US 2010/0115156 A1 May 6, 2010

(30) Foreign Application Priority Data

Oct. 31, 2008 (TW) ................................ 97142234 A

(51) Int. Cl.
*G06F 13/12* (2006.01)
*G06F 13/38* (2006.01)
(52) U.S. Cl. ........................................................ 710/62
(58) Field of Classification Search ...................... 710/62
See application file for complete search history.

(56) References Cited

U.S. PATENT DOCUMENTS

| 7,239,806 | B2 * | 7/2007 | Chen ............................. 396/301 |
| 7,885,622 | B2 * | 2/2011 | Krampf et al. ............. 455/154.1 |
| 2008/0138028 | A1 * | 6/2008 | Grady et al. ...................... 386/1 |
| 2010/0062615 | A1 * | 3/2010 | Prest .............................. 439/38 |

FOREIGN PATENT DOCUMENTS

| EP | 0 665 170 A1 | 2/1995 |
| TW | 2006 01202 | 3/2006 |

* cited by examiner

*Primary Examiner* — Chun-Kuan Lee
(74) *Attorney, Agent, or Firm* — Bacon & Thomas, PLLC

(57) ABSTRACT

An electronic device capable of matching a multimedia playback device is disclosed. The electronic device comprises a slot, a connecting port, a sliding cover, a positioning device, and an identification device. The slot is used to accommodate the multimedia playback device. The connecting port is used to electrically connect the multimedia playback device. The sliding cover matches with the slot. The sliding cover has a support structure to support the multimedia playback device. The positioning device is used to fix the sliding cover at a specific position. The identification device is used to identify the type of the multimedia playback device. When the multimedia playback device is accommodated in the slot, the sliding cover fixes in a specific position to match and support the multimedia playback device.

8 Claims, 5 Drawing Sheets

ELECTRONIC DEVICE CAPABLE OF MATCHING A MULTIMEDIA PLAYBACK DEVICE

BACKGROUND OF THE INVENTION

1. Field of the Invention

The present invention relates to an electronic device capable of being connected to a multimedia playback device and, more particularly, to an electronic device capable of matching different types of multimedia playback device.

2. Description of the Related Art

With developments in technology, multimedia playback devices on the market have increased in variety. In particular, users also require the multimedia playback devices to produce better tone quality. Therefore, an electronic device which is used to match the multimedia playback device is disclosed in the market.

For example, there are many types of iPod® or iPhone®, produced by Apple, Inc.®, on the market. Therefore, the prior art technology discloses an electronic device used to support all types of iPods®. Please refer to FIG. 1A. FIG. 1A is a schematic drawing of an electronic device of the prior art. In the prior art, a multimedia playback device 91 is accommodated in a slot of an electronic device 90 and electrically connected to a connecting port (not shown) of the electronic device 90. The electronic device 90 is used to play the music stored in the multimedia playback device 91. The electronic device 90 further comprises a support dock 92 to support the multimedia playback device 91. However, when the multimedia playback device 91 is changed, the support dock 92 must be replaced, too. By disposing different support docks 92, the electronic device 90 is capable of supporting the multimedia playback devices 91 of different sizes, and the multimedia playback device 91 will be mounted firmly in the slot. Therefore, the electronic device 90 has to be sold with different types of support docks 92. As a result, the support dock 92 of the prior art not only increases the manufacturing cost of the electronic device 90 but also causes inconvenience to the user.

Therefore, it is desirable to provide an electronic device capable of matching all types of multimedia playback device to mitigate and/or obviate the aforementioned problems.

SUMMARY OF THE INVENTION

A main objective of the present invention is to provide an electronic device capable of matching all types of multimedia playback device.

In order to achieve the above mentioned objective, the electronic device of the present invention comprises a slot, a connecting port, a sliding cover, a positioning device, and an identification device. The slot is used to accommodate the multimedia playback device. The connecting port is used to electrically connect the multimedia playback device. The sliding cover matches with the slot. The sliding cover has a support structure to support the multimedia playback device. The positioning device is used to fix the sliding cover at a specific position. The identification device is used to identify the type of multimedia playback device. When the multimedia playback device is accommodated in the slot, the sliding cover fixes at a specific position to match and support the multimedia playback device Other objects, advantages, and novel features of the invention will become more apparent from the following detailed description when taken in conjunction with the accompanying drawings.

DETAILED DESCRIPTION OF THE PREFERRED EMBODIMENT

The advantages and innovative features of the invention will become more apparent from the following descriptions of the preferred embodiments.

Figure 1:
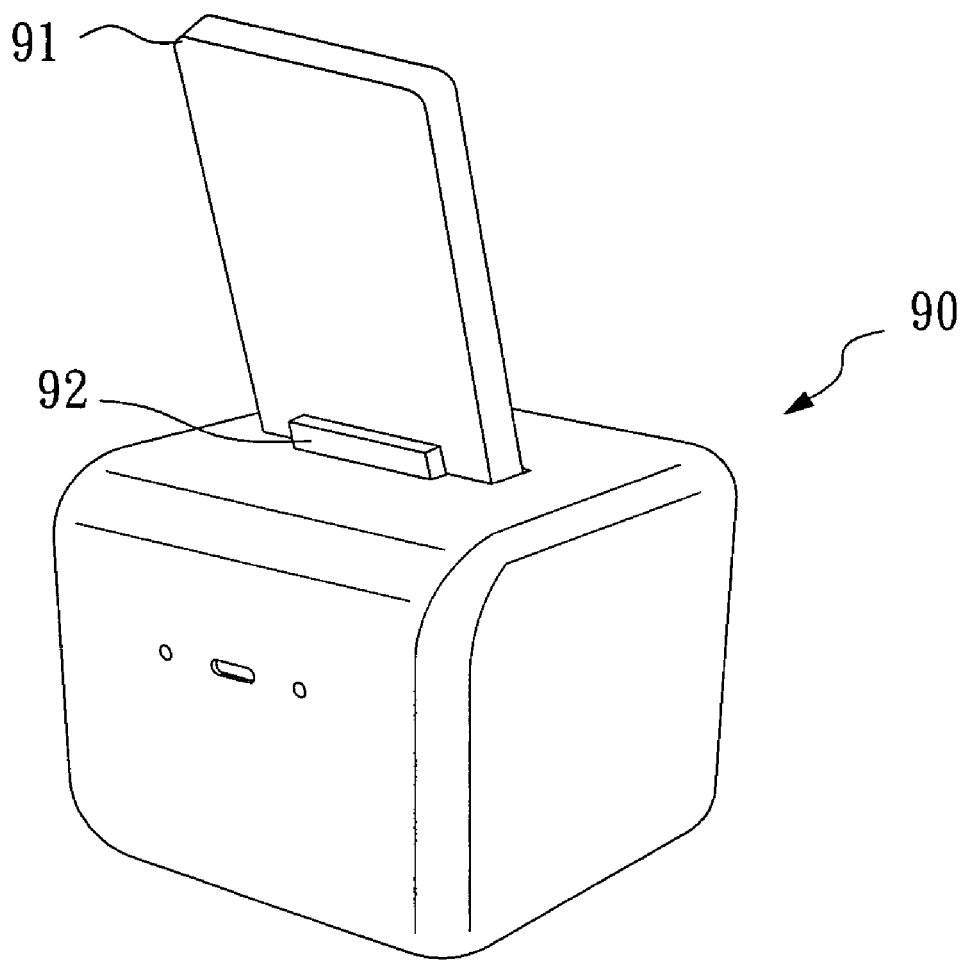
FIG. 1 is a schematic drawing of an electronic device of the prior art.
Figure 2A:
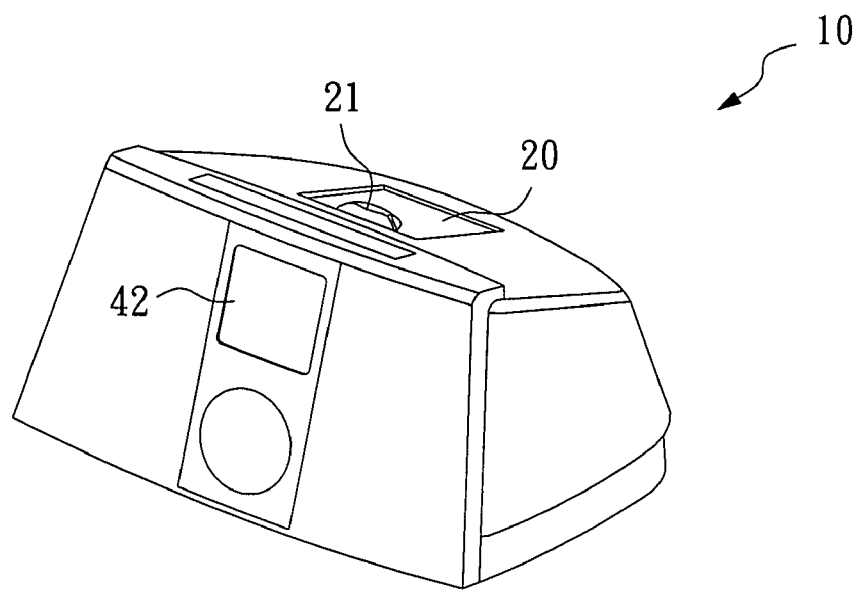
FIG. 2A is a schematic drawing of a sliding cover of an electronic device according to an embodiment of the invention in the closed position.
Figure 2B:
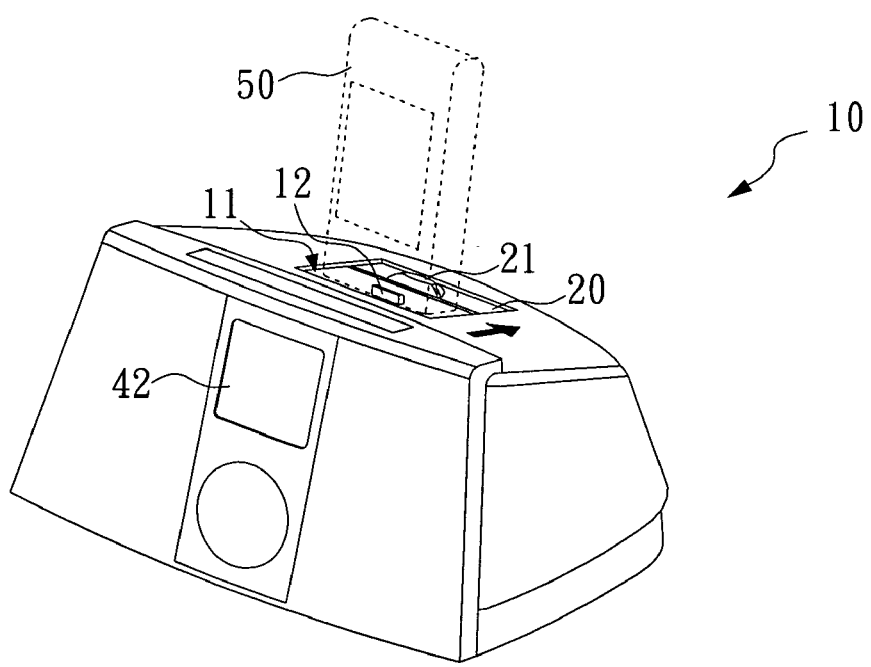
FIG. 2B is a schematic drawing of the sliding cover of the electronic device according to an embodiment of the invention in the open position.

Please refer to FIG. 2A and FIG. 2B. FIG. 2A is a schematic drawing of a sliding cover of an electronic device according to an embodiment of the invention in the closed position, and FIG. 2B is a schematic drawing of the sliding cover of the electronic device according to an embodiment of the invention in the open position.

The electronic device 10 is used for connecting a multimedia playback device 50 and capable of playing the music stored in the multimedia playback device 50. But the electronic device 10 of the invention is not limited to connect with the multimedia playback device 50. The electronic device 10 can also be a radio or an audio device. For ease of explanation, the iPod® or iPhone® produced by Apple, Inc.® is used as an example of the multimedia playback device 50 in the following description, but the multimedia playback device 50 is not limited in the invention.

Figure 3:
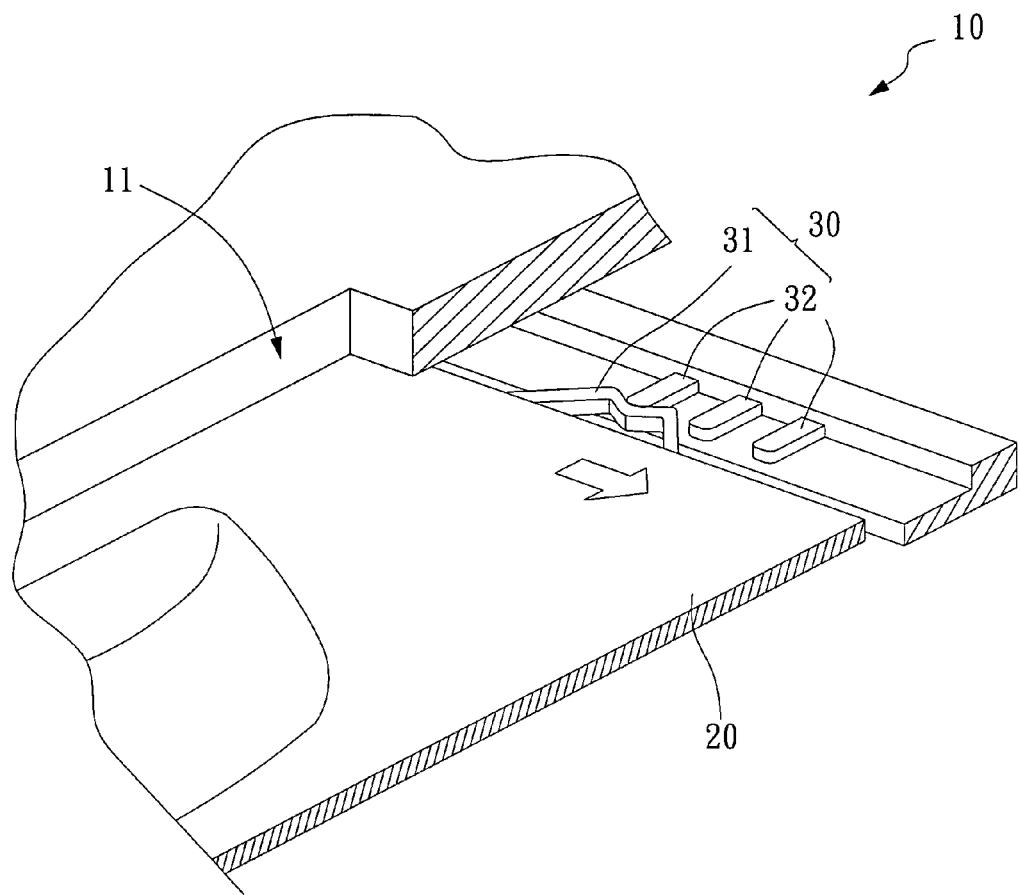
FIG. 3 is a structural drawing of a positioning device of the electronic device according to an embodiment of the invention.
Figure 5:
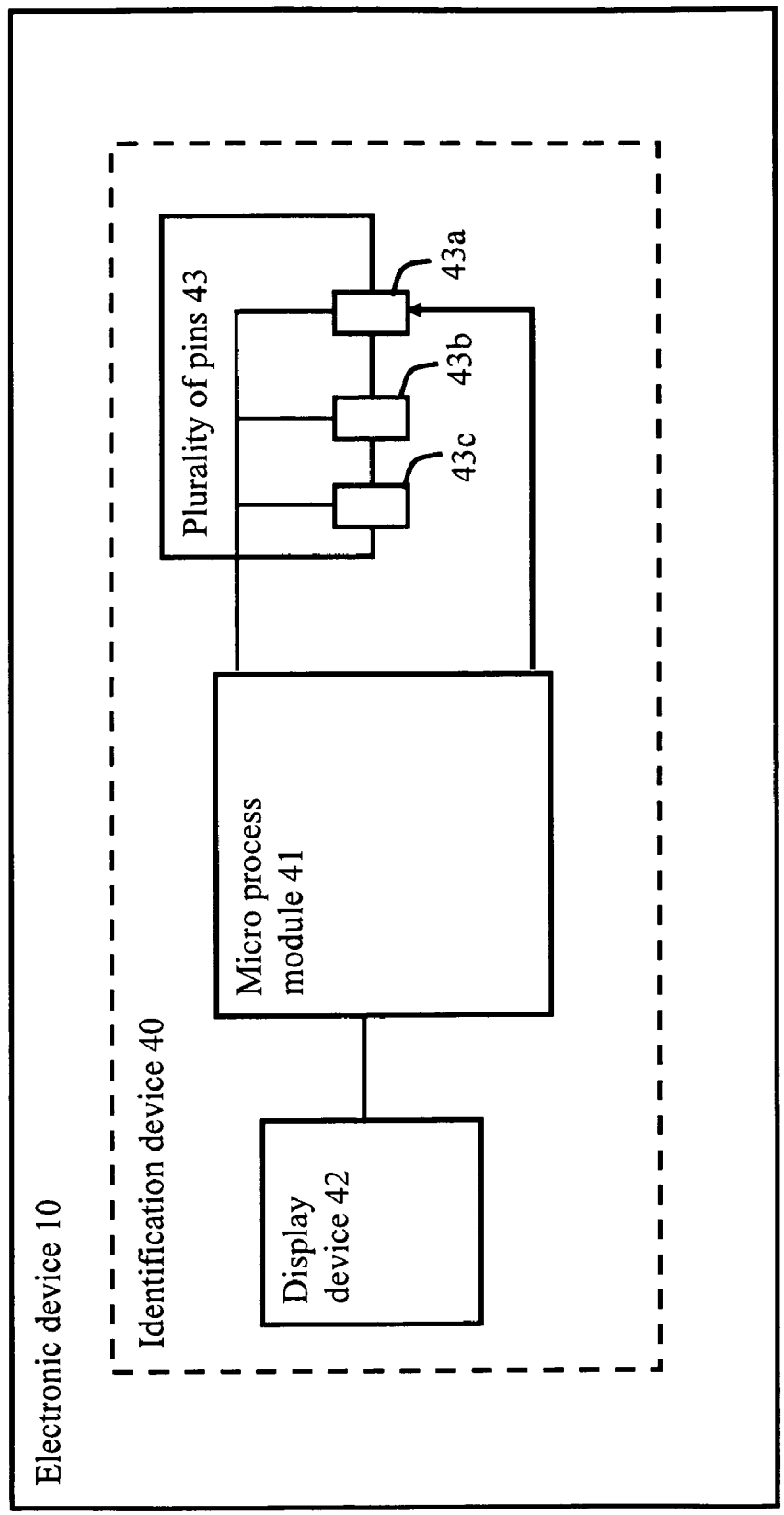
FIG. 5 is a functional block drawing of an identification device of the electronic device according to an embodiment of the invention.

The electronic device 10 of the invention comprises a slot 11, a connecting port 12, a sliding cover 20, a positioning device 30 (as shown in FIG. 3), and an identification device 40 (as shown in FIG. 5). The slot 11 is used to accommodate the multimedia playback device 50, and the multimedia playback device 50 is electronically connected to the connecting port 12. The connecting port 12 is a connector capable of matching the standard of the multimedia playback device 50. The sliding cover 20 is disposed on the slot 11 and slides along a notch of the slot 11 by matching with a sliding chute (not shown). The sliding cover 20 has a support structure 21. When the multimedia playback device 50 is accommodated in the slot 11, the electronic device 10 supports the multimedia playback device 50 with the support structure 21. In order to match the size of the multimedia playback device 50, the sliding cover 20 can be fixed at a specific position with the positioning device 30. The identification device 40 is used to identify the type of the multimedia playback device 50. The positioning device 30 and the identification device 40 will be described later.

In the embodiment, the slot 11 of the invention is sloped at a specific angle. When the multimedia playback device 50 of a larger size is accommodated, the multimedia playback device 50 can be supported by the support structure 21 sloped at the specific angle. Therefore, the multimedia playback device 50 can be held firmly when accommodated in the slot 11 to avoid the damage to the connecting port 12. The support structure 21 further has a flexible material to contact with the multimedia playback device 50. The flexible material in the embodiment is foam, but it is not limited in the invention. In addition, if the width of the multimedia playback device 50 and the opening width of the sliding cover 20 differ slightly, the flexible material is able to adjust for the slight difference.

Figure 4A:
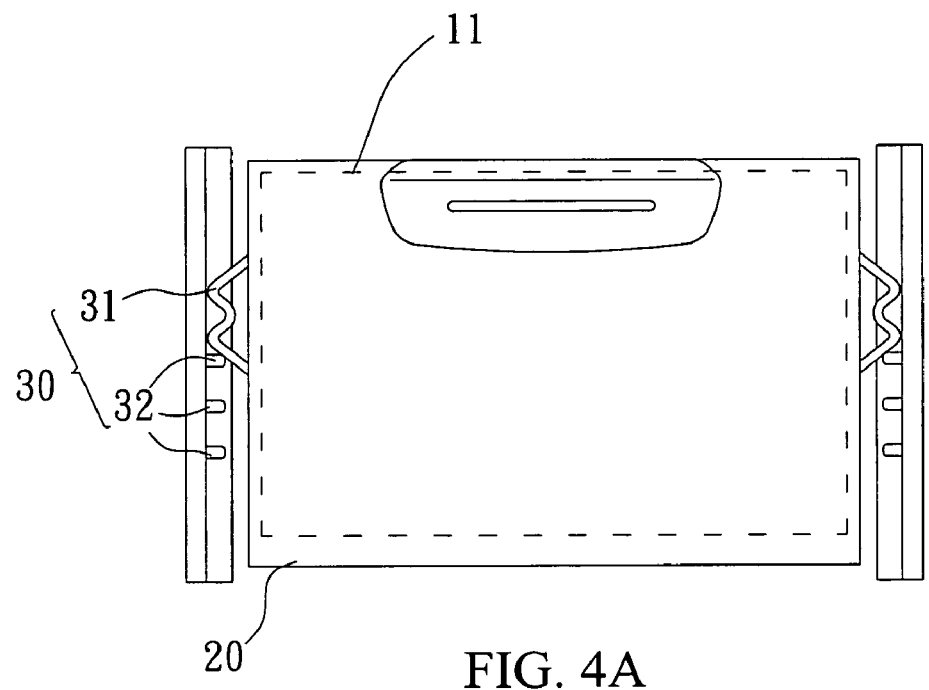
FIG. 4A is an operational drawing of the sliding cover of the electronic device according to an embodiment of the invention in the closed position.
Figure 4B:
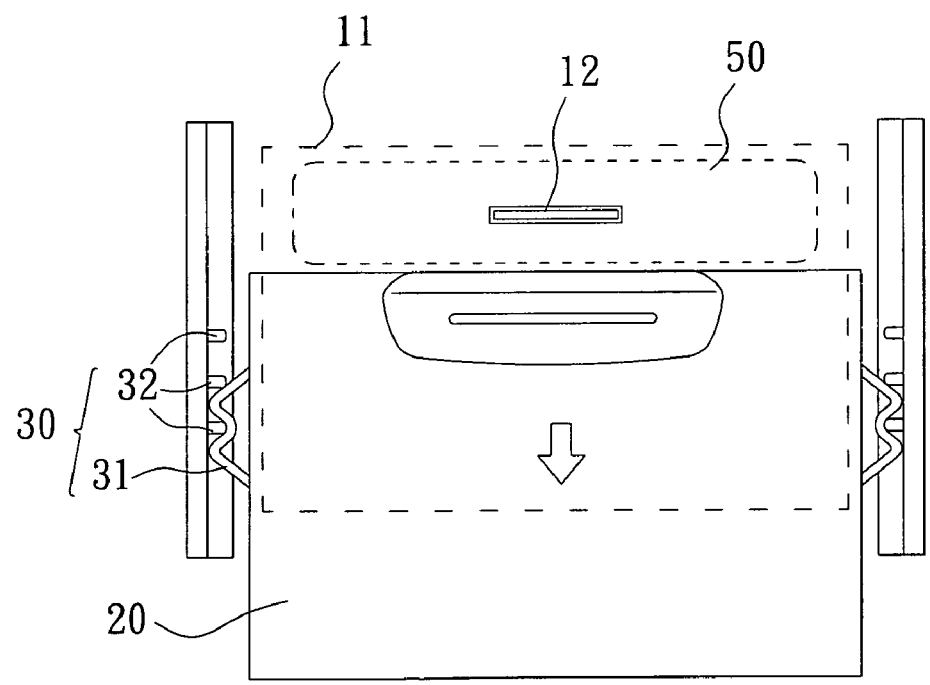
FIG. 4B is an operational drawing of the sliding cover of the electronic device according to an embodiment of the invention in the open position.

Please refer to FIG. 3 to FIG. 4B. FIG. 3 is a structural drawing of a positioning device of the electronic device according to an embodiment of the invention. FIG. 4A is an operational drawing of the sliding cover of the electronic device according to an embodiment of the invention in the closed position. FIG. 4B is an operational drawing of the sliding cover of the electronic device according to an embodiment of the invention in the open position.

In the embodiment, the positioning device 30 comprises a flexible component 31 and a plurality of ratchets 32. The flexible component 31 is an M-shaped structure and is disposed on the sliding cover 20. The plurality of ratchets 32 is disposed at the notch of the slot 11. When the sliding cover 20 is sliding, the sliding cover 20 can be fixed in a specific position by the correspondence between the flexible component 31 and the plurality of ratchets 32. The number and the position of the plurality of ratchets 32 can be changed to meet requirements, for example, by the sizes of the different multimedia playback devices 50. As a result, when the sliding cover 20 in the closed position (as shown in FIG. 4A) or in the open position (as shown in FIG. 4B) to accommodate the multimedia playback device 50, the sliding cover 20 can be fixed and not capable of sliding. The positioning device can also be a spring, a screw, or a lock structure.

Please refer to FIG. 5. FIG. 5 is a functional block drawing of an identification device of the electronic device according to an embodiment of the invention.

The identification device 40 comprises a micro processing module 41, a display device 42, and a plurality of pins 43. The micro processing module 41 is electrically connected to the display device 42. The display device 42 is a liquid crystal display device and is used to display the type of the multimedia playback device 50 as an icon or as a character. The plurality of pins 43 are a plurality of sheets of electrically conductive material and are disposed on the sliding cover 20, but they are not limited in the invention. The number of the plurality of pins 43 is used for matching the adjustment degrees of the sliding cover 20. For example, in FIG. 5, the plurality of pins 43 comprise a first pin 43a, a second pin 43b, and a third pin 43c. The different pins 43 represent the different adjustment degrees of the sliding cover 20, namely the types of the multimedia playback devices 50 that can be connected to the electronic device 10. When the sliding cover 20 is sliding, the micro processing module 41 will contact the different pins 43 and emit different feedback signals. In this way, the micro processing module 41 can identify the type of the multimedia playback device 50 and display the type of the multimedia playback device 50 on the display device 42.

For example, if the micro processing module 41 contacts the first pin 43a, it means the sliding cover 20 is in the closed position. Then the display device 42 displays an icon or a character representing the absence of a multimedia playback device 50. If the micro processing module 41 contacts the second pin 43b, it means the electronic device 10 is accommodating a multimedia playback device 50 having a small volume, such as the iPod Mini®. Then the display device 42 displays an icon or a character representing the iPod Mini®. If the micro processing module 41 contacts the third pin 43c, it means the electronic device 10 is accommodating a multimedia playback device 50 having a large volume, such as the iPod Classic®. Then the display device 42 displays an icon or a character representing the iPod Classic®.

Please note that the functional block aforementioned is used only as an example. The number of the plurality of pins 43 can be changed to meet a variety of requirements, and the connection of the identification device 40 is not limit to the aforementioned embodiments.

Although the present invention has been explained in relation to its preferred embodiment, it is to be understood that many other possible modifications and variations can be made without departing from the spirit and scope of the invention as hereinafter claimed.

What is claimed is:

1. An electronic device capable of matching a multimedia playback device comprising:
    a slot used to accommodate the multimedia playback device;
    a connecting port used to electrically connect the multimedia playback device;
    a sliding cover disposed on the slot and sliding along a notch of the slot, the sliding cover having a support structure to support the multimedia playback device;
    a positioning device used to fix the sliding cover at a specific position; wherein when the multimedia playback device is accommodated in the slot, the sliding cover is fixed in a specific position to match and support the multimedia playback device; and
    an identification device used to identify the type of the multimedia playback device, wherein the identification device comprises:
    a micro processing module;
    a display device electrically connected to the micro processing module; and
    a plurality of pins disposed on the sliding cover;
    wherein when the sliding cover is fixed at the specific position, the micro processing module contacts one of the pins to identify the type of the multimedia playback device and displays the type of the multimedia playback device on the display device.

2. The electronic device as claimed in claim 1, wherein the slot is sloping at a specific angle.

3. The electronic device as claimed in claim 1, wherein the positioning device comprises:
    a flexible component disposed at the sliding cover; and
    a plurality of ratchets disposed at the notch of the slot;
    wherein the sliding cover is fixed at the specific position by the correspondence between the flexible component and the plurality of ratchets.

4. The electronic device as claimed in claim 1, wherein the support structure of the sliding cover contacts the multimedia playback device via a flexible material.

5. The electronic device as claimed in claim 4, wherein the flexible material is made of foam.

6. The electronic device as claimed in claim 1, wherein the plurality of pins is a plurality of sheets of electrically conductive material.

7. The electronic device as claimed in claim 1, wherein the display device is a liquid crystal display device.

8. The electronic device as claimed in claim 7, wherein the display device is used to display the type of the multimedia playback device as an icon or as a character.

* * * * *